CASH REGISTERS AND LIKE ADDING MACHINES

Filed Oct. 22, 1962 13 Sheets-Sheet 1

INVENTORS
HENRY GROSS
SAMUEL GROSS
BY Irvin S. Thompson
ATTY.

June 1, 1965 H. GROSS ETAL 3,186,637

CASH REGISTERS AND LIKE ADDING MACHINES

Filed Oct. 22, 1962 13 Sheets-Sheet 2

INVENTORS

HENRY GROSS

SAMUEL GROSS

BY Irwin S. Thompson

ATTY.

June 1, 1965 H. GROSS ETAL 3,186,637

CASH REGISTERS AND LIKE ADDING MACHINES

Filed Oct. 22, 1962 13 Sheets-Sheet 3

INVENTORS

HENRY GROSS

SAMUEL GROSS

BY Irwin S. Thompson

ATTY.

June 1, 1965 H. GROSS ETAL 3,186,637

CASH REGISTERS AND LIKE ADDING MACHINES

Filed Oct. 22, 1962 13 Sheets-Sheet 4

INVENTORS
HENRY GROSS
SAMUEL GROSS
BY Irwin S. Thompson
ATTY.

INVENTORS
HENRY GROSS
SAMUEL GROSS
BY Irwin A. Thompson
ATTY.

June 1, 1965 H. GROSS ETAL 3,186,637

CASH REGISTERS AND LIKE ADDING MACHINES

Filed Oct. 22, 1962 13 Sheets-Sheet 6

*INVENTORS*

HENRY GROSS

SAMUEL GROSS

BY Irwin N. Thompson

ATTY.

INVENTORS
HENRY GROSS
SAMUEL GROSS
BY Irwin S. Thompson
ATTY.

INVENTORS
HENRY GROSS
SAMUEL GROSS
By Irwin H. Thompson
ATTY.

INVENTORS

HENRY GROSS

SAMUEL GROSS

BY Irwin V. Thompson

ATTY.

June 1, 1965 H. GROSS ETAL 3,186,637

CASH REGISTERS AND LIKE ADDING MACHINES

Filed Oct. 22, 1962 13 Sheets-Sheet 10

INVENTORS

HENRY GROSS

SAMUEL GROSS

BY Irwin F. Thompson

ATTY.

INVENTORS
HENRY GROSS
SAMUEL GROSS
By Irwin S. Thompson
ATTY.

INVENTORS
HENRY GROSS
SAMUEL GROSS
By Irwin S. Thompson
ATTY

June 1, 1965 H. GROSS ETAL 3,186,637

CASH REGISTERS AND LIKE ADDING MACHINES

Filed Oct. 22, 1962 13 Sheets-Sheet 13

INVENTORS
HENRY GROSS
SAMUEL GROSS
BY Irwin S. Thompson
ATTY.

United States Patent Office 3,186,637

Patented June 1, 1965

3,186,637

CASH REGISTERS AND LIKE ADDING MACHINES

Henry Gross, "Braewood," Winnington Road, and Samuel Gross, 22 Winnington Road, both of London N. 2, England Filed Oct. 22, 1962, Ser. No. 232,134
Claims priority, application Great Britain, Nov. 8, 1961, 39,972/61, 39,973/61
9 Claims. (Cl. 235—6)

This invention relates to cash registers and like adding machines of the kind comprising toothed elements which, during the entry of amounts into the machine, are differentially movable under the control of manually operable amount keys or the like, printing mechanism including type elements in mesh with said toothed elements and a pair of adding mechanisms each having toothed wheels engageable with said toothed elements during each operational cycle of the machine, the movements of the toothed elements during total taking being controlled by said toothed wheels.

The invention has for an object an improved and simplified machine and to this end each adding mechanism comprises a unit movable to engage the toothed wheels thereof with the said toothed elements by means of a group of actuating elements selectively co-operable with said adding unit under the control of manually operable members.

Preferably the said actuating elements are in the form of cams arranged in two groups, each of which groups is co-operable with a displaceable follower on one of the adding units. Preferably also the manually operable members comprise press buttons which may be arranged in two banks one to either side of the amounts keys, and the cam followers are movably mounted on the adding units so as to register with predetermined cams in dependence upon the particular press buttons which have been depressed. Conveniently, one bank of press buttons controls the entry of items, such as the purchases made by a customer in a store, into the machine, and also the totalling of said items, while the other bank controls the taking of a total of the purchases made over a given trading period, e.g. one day, the arrangement being such that no cam operation conditioned by actuation of one of said first bank of buttons can affect a cam operation conditioned by actuation of one of said other bank of buttons. For this reason it is possible to use the buttons of the said first bank additionally to control the circuit of a motor for operating the machine.

An embodiment of the invention is illustrated by way of example in the accompanying drawings, in which FIGURE 1 is a front perspective view of the complete machine;

Figure 1:
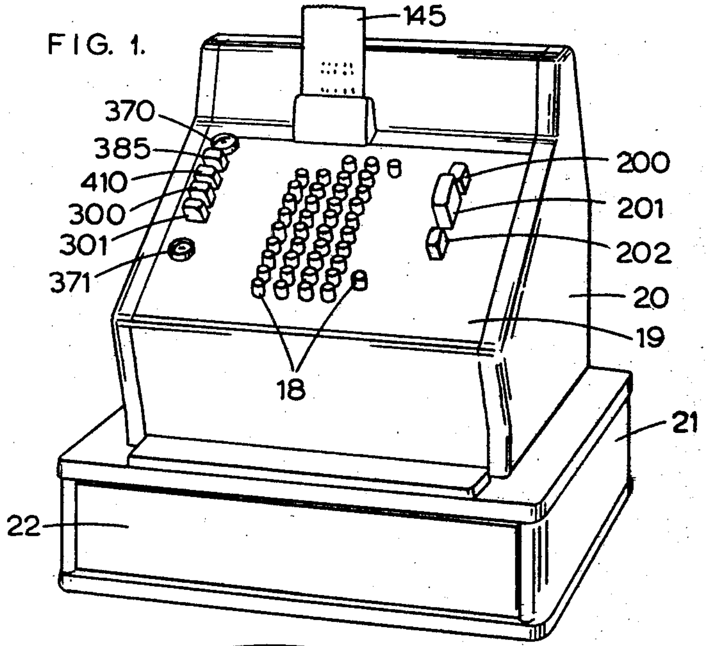
Figure 2A:
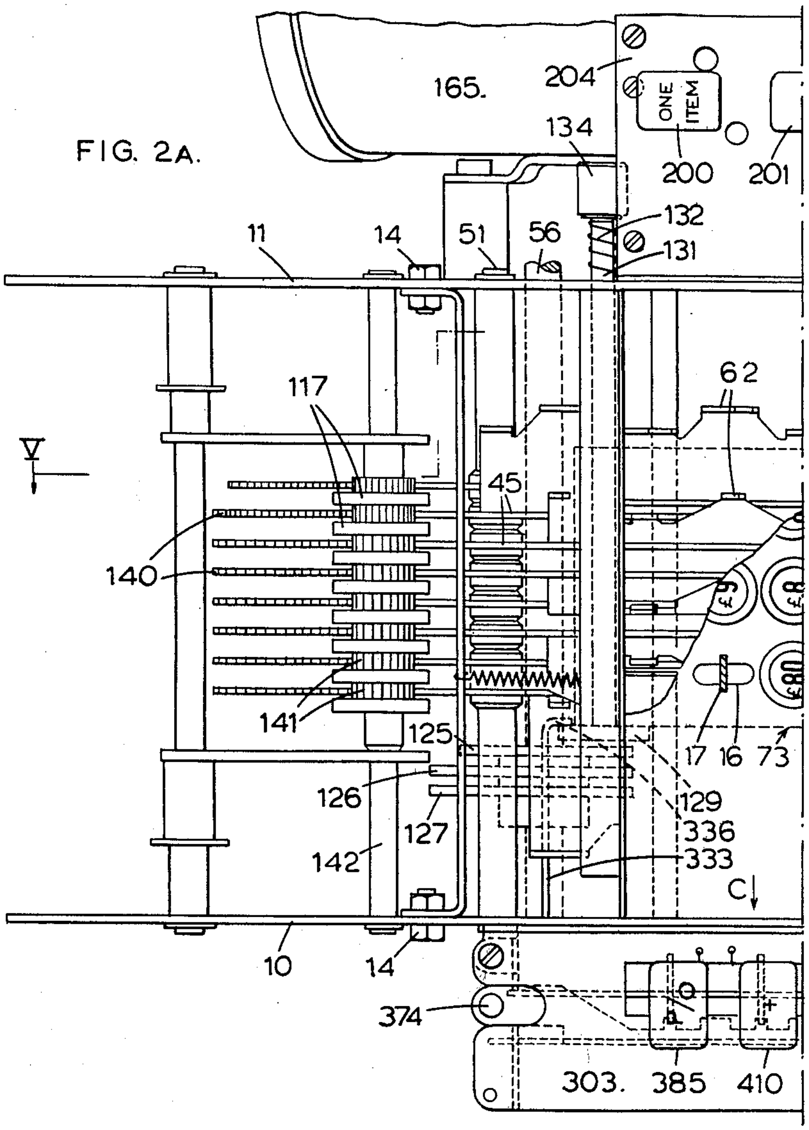
FIGURE 2 is a fragmentary plan view perpendicularly of the keyboard with the casing and printing platen removed.
Figure 2B:
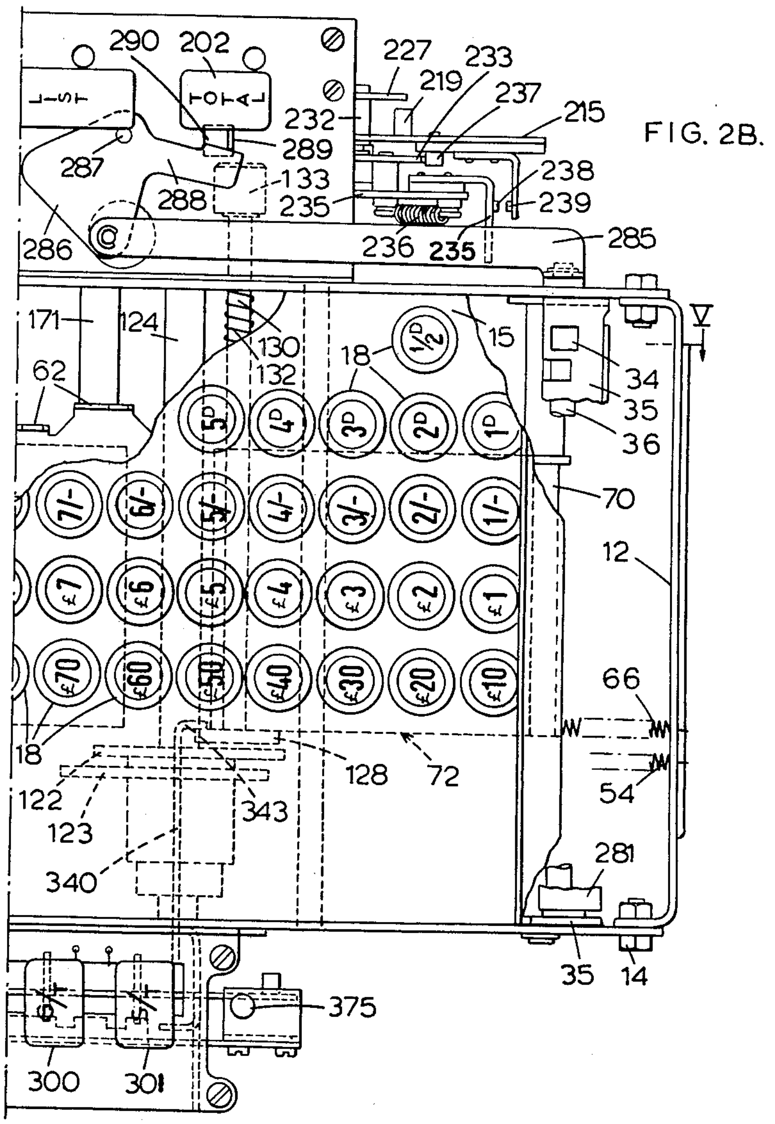

Referring now to the drawings and firstly to FIGURES 1 to 5 thereof, the machine comprises a pair of side frame members 10, 11 which are connected together in spaced relationship by transverse frame members 12, 13 secured to members 10, 11 by bolts 14. Also secured to and extending between the side frame members 10, 11 is a keyboard plate 15 formed with rows of notched slots 16 through which extend and are guided the shanks 17 of amount press buttons or keys 18, the respective rows of buttons, reading from right to left in FIGURES 1 and 2, representing one halfpenny and elevenpence, one to ten pence, one to ten shillings, one to nine pounds and ten to ninety pounds. The amount buttons 18 project through openings in a cover 19 which is bolted to the plate 15, and the machine is enclosed in a cabinet 20 attached to a base compartment 21 which accommodates a conventional cash drawer 22. The cash drawer is spring-loaded towards the open position against the action of retaining means actuable during operation of the machine to release the drawer in well known manner.

At their lower ends the amount button shanks 17 are guided within slots in a plate 25 (FIGURE 5) which is bolted to front and rear transverse end plates 26, 27 in turn bolted to the plate 15. Between the plates 15 and 25 there are provided for each row of amount buttons upper and lower slide bars 28, 29 which project through and are guided for longitudinal movement in the end plates 26, 27, said slide bars being slotted at 30, 31 respectively for the passage of the button shanks 17. Each slide bar 28 is urged rearwardly by a tension spring 32 anchored to the transverse frame member 13 and at its forward end is formed with an angled portion 33 engaged in a slot 34 in an inverted U-shaped plate 35 pivoted on a shaft 36 secured to the side frame members 10, 11. Each amount button 18 is urged upwardly by a compression spring 37 interposed between said button and the plate 15, and each button shank 17 is formed with a projection 38 which, by passing through the corresponding slot 31 in slide bar 29, retains a depressed button in the actuated position. The upper inoperative position of the amount buttons is determined by a rod 39 secured to the lower face of the plate 25 and passing through slots 40 in the button shanks.

Figure 5A:
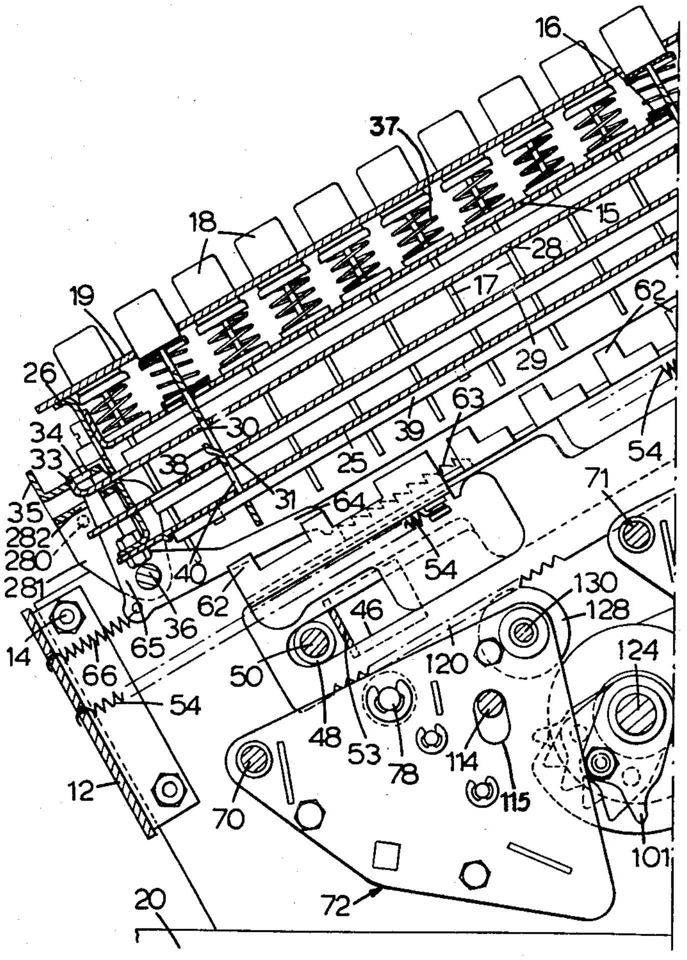
FIGURE 5 is a longitudinal section on line V—V of FIGURE 2.
Figure 5B:
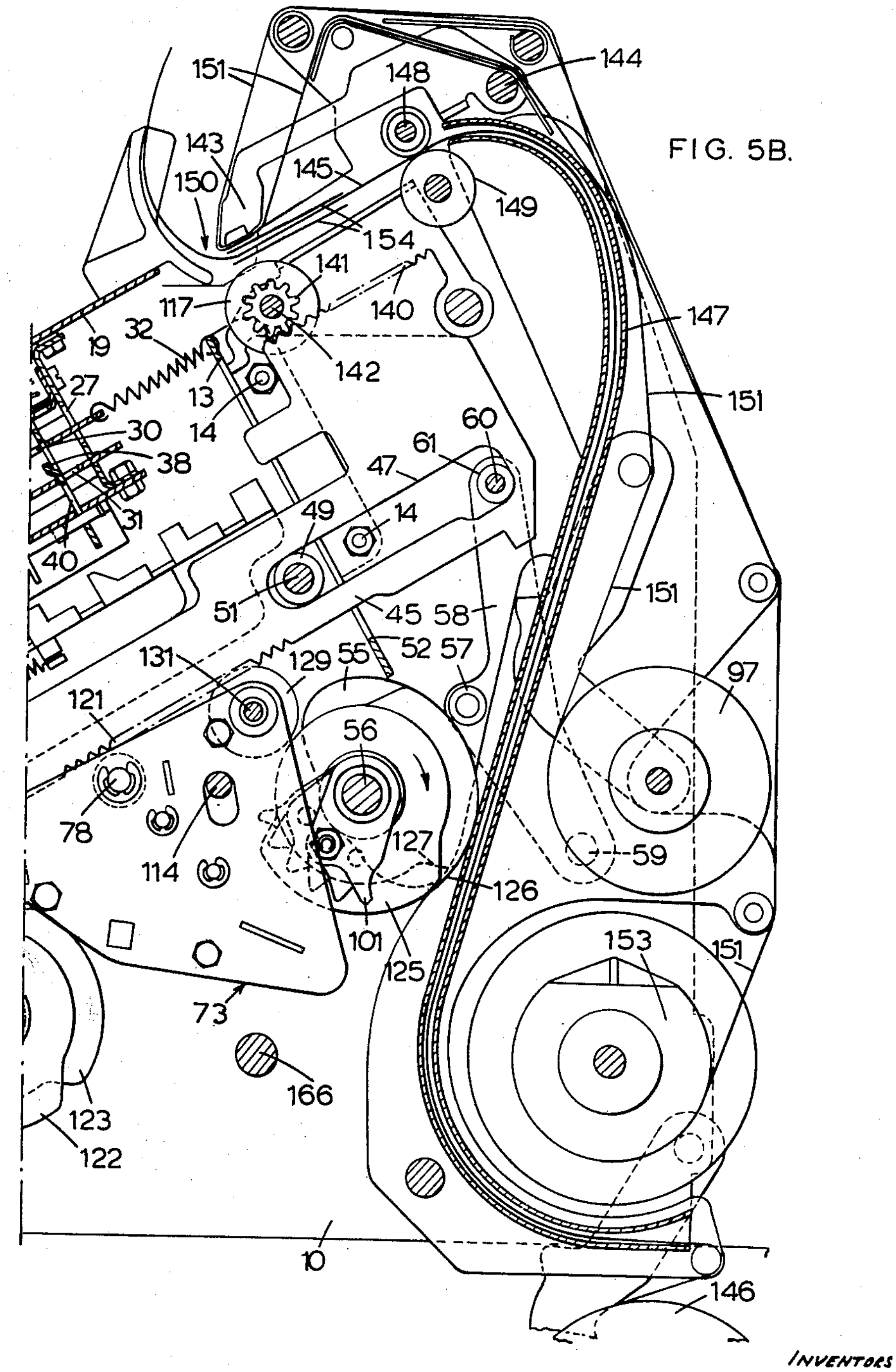

Beneath the rows of amount button shanks are rack bars 45 having therein slots 46, 47 by which said bars are supported on rollers 48, 49 rotatable on spindles 50, 51 secured to the side frame members 10, 11, the rack bars being guided for longitudinal reciprocal movement within slots 52 in the rear transverse frame member 13 and at their forward ends on a notched transverse plate 53 bolted to the said side frame members and extending through slots 46. There is one rack bar for the halfpenny button and one each for the pence, units shillings, ten shillings, units pounds and ten pound buttons. The rack bars are loaded in the forward direction by tension springs 54 anchored to the front transverse frame member 12 and their reciprocal movements are controlled by a pair of identical cams 55 (only one of which is shown in FIGURE 5) secured on a transverse shaft 56 journalled in the side frame members 10, 11, said shaft being rotated, as will later be described, through one complete revolution during each cycle of operation of the machine. Co-operating with cams 55 are follower rollers 57 carried by levers 58 pivoted a 59 on the respective side frame members 10, 11 and between which extends a rod 60 carrying rollers 61 one of which is engaged in the rear end of each rack bar slot 47.

Each rack bar 45 is provided with a plurality of upstanding lugs or abutments 62 corresponding in number to the buttons in the associated amount button bank and each so located, relative to the corresponding button shank, as to arrest the rack bar at a predetermined position in its forwad travel corresponding to the value of the button which has been depressed. The rack bars are formed at the forward upper end with ratchet teeth 63 with which engage pawls 64 pivoted on the shaft 36 and having tails 65 with which co-operate the forward ends of the slide bars 29. The pawls 64 are normally held by tension springs 66 in their operative positions thereby to retain the rack bars against forward travel, under the action of springs 54, until a button has been depressed, whereupon the associated slide bar 29 is moved forwardly by the button shank and rocks the pawl into the retracted position.

Figure 6:
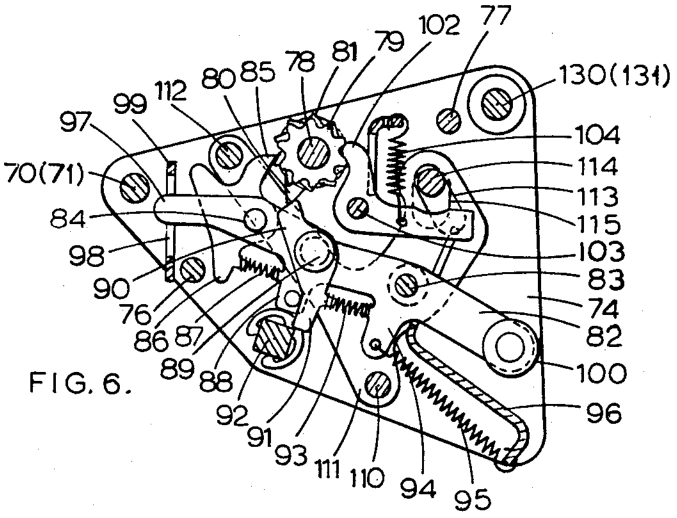
FIGURE 6 is an enlarged detail sectional view showing one of the adding units.
Figure 7:
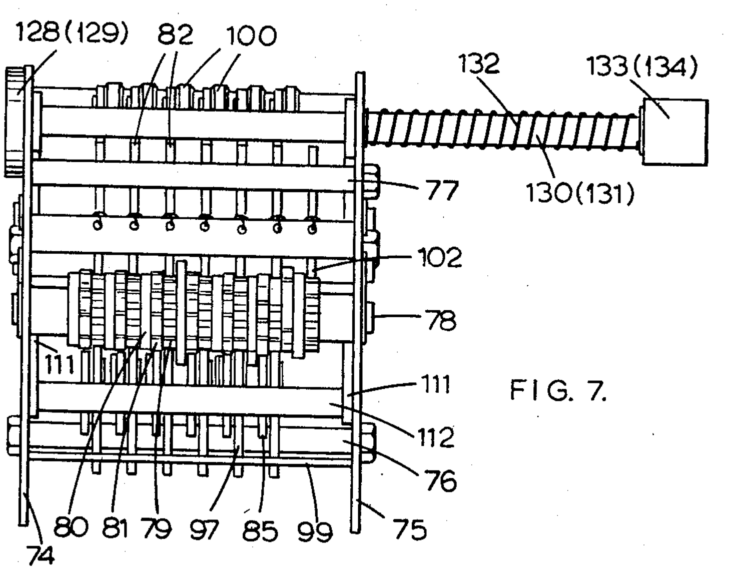
FIGURE 7 is a plan view of FIGURE 6.

Rockably mounted beneath the rack bars 45 on transverse spindles 70, 71 secured to the side frame members 10, 11 are a pair of adding units or counters 72, 73 details of which are shown in FIGURES 6 and 7. Each adding unit comprises a pair of side plates 74, 75 secured together in spaced relationship by tie rods 76, 77 and in their upper parts said side plates carry a shaft 78 on which are rotatably mounted a plurality of toothed counter wheels 79, there being one toothed wheel for each rack bar 45. Each toothed wheel 79 has secured thereto a transfer trip cam 80, and, with the exception of the halfpenny wheel, a ratchet wheel 81. Each two adjacent toothed wheels 79 have associated therewith a transfer lever 82 to which a trip movement is imparted under control of the trip cam 80 associated with the toothed wheel 79 of lower denomination when said wheel has completed a full rotational movement or, in the case of the halfpenny and ten shilling wheels a predetermined fractional rotational movement, from the zero position. The transfer levers are freely mounted on a shaft 83 secured in the side plates 74, 75 and each said lever carries a stud 84 on which is pivotally mounted a transfer pawl 85 formed with a tail 86. A compression spring 87 interposed between tail 86 and a lug 88 on the transfer lever 82 urges the pawl 86 into engagement with the ratchet wheel 81 of next higher denomination. Also pivotally carried by each transfer lever on a stud 89 projecting from the side of said lever opposite the stud 84 is a trip pawl 90 adapted to be engaged by the trip cam 80 associated with the adjacent toothed wheel of lower denomination to initiate the transfer operation. The trip pawl 90 carries a tail 91 engageable with a bar 92 fixed in the side plates 74, 75 and a compression spring 93 is interposed between said tail 91 and a lug 94 on the transfer lever 82. A tension spring 95 extends between lug 94 and a bracket 96 carried by the side plates 74, 75 and said spring 95, in conjunction with spring 93, normally holds the tail 91 of pawl 90 on the top face of bar 92. Rocking movement of the transfer lever 82 about shaft 83 under the action of spring 95 is limited by the engagement of one end 97 of said lever with the lower end of a slot 98 formed in a transverse plate 99 secured to the side plates 74, 75. The other end of lever 82 carries a roller 100 which is engageable by one of a nest of transfer cams 101 as will later be described. A locating or centering pawl 102 pivotally mounted on a shaft 103 fixed in the side plates 74, 75 is urged by a tension spring 104 into engagement with each toothed wheel 79 to position the latter and its associated trip pawl and ratchet wheel accurately after being rotated.

Pivotally mounted on a shaft 110 secured to the side plates 74, 75 are two arms 111 between which extends a bail 112 passing above and normally clear of the transfer pawls 85. Each arm 111 is formed with a slot 113 through which passes a bar 114 extending across the machine and secured in the side frame members 10, 11, said bar also passing through slots 115 in the side plates 74, 75. The slots 115 extend in the direction of a tangent to the arc of rocking movement of the adding unit about spindle 70, 71, but the slots 113 in arms 111 are inclined to said tangent in such direction that, as the adding unit is rocked upwardly towards the rack bars 45, the arms 111 are pivoted in the counter-clockwise direction about shaft 110 to engage the bail 112 with the transfer pawls and rock the latter out of engagement with the ratchet wheels 81.

The adding unit 72, which will be referred to hereinafter as the "item" unit, is operable to store amounts such as the different purchases made by a customer in a store. This adding unit, as will later appear, may also be used to control the setting of type wheels 117 to print the different amounts and the total value of the said purchases on a ticket strip. The other adding unit 73, which will be referred to hereinafter as the "accumulator" unit, is operable to store the amounts of purchases made during a given trading period such as one day, and may be used to control the setting of the type wheels 117 to print the total sales in such period. Each rack bar 45 is provided on its lower edge with two racks 120, 121 with which the corresponding toothed counter wheels 79 are engageable by rocking the adding units upwardly about spindles 70, 71, such rocking movements being controlled, in the case of the item unit 72, by a group of two cams 122, 123 secured on a transverse shaft 124 journalled in the side frame members 10, 11 and which also carries the transfer cams 101 for said adding unit and, in the case of the accumulator unit 73, by a group of three cams 125, 126, 127 secured on the shaft 56, the latter also carrying the transfer cams 101 for said adding unit 73. Each adding unit carries a cam follower 128 or 129 which is engageable, as will later be described, with any one of the cams of the associated group, being for this purpose rotatably mounted on a spindle 130 or 131 which is axially movable parallel to the associated cam shaft 124 or 56. A spring 132 coiled on each cam follower spindle and which is compressed between the adding unit side plate 75 and a collar 133 or 134 on the spindle 130 or 131 normally retains said spindle in an end position in which the follower 128 or 129 is out of register with the corresponding group of cams.

To enable the amounts entered into the item adding unit 72 to be printed, the rack bars 45 are provided at their rear upper ends with rack teeth 140 with which are meshed pinions 141 rotatable on a spindle 142 secured in the side frame members 10, 11, and each secured to one of the type wheels 117. A platen 143 is rockably mounted on a spindle 144 also secured in the side frame members 10, 11 and a paper strip 145 drawn from a supply roll 146 through a guide channel 147 and between a pair of guide rolls 148, 149 is fed between the platen and the type wheels. The platen is actuated, as from camshaft 56, in any desired or conventional manner (not shown) during each operation of the machine to print the amounts and totals set up in the adding unit 72 and the strip 145 may issue through an opening 150 in the cabinet 20, the printed portion then being severable from the strip to serve as a receipt ticket for the customer. A second paper strip 151 passing between the platen and the type wheels from a supply roll 152 to a storage spool 153 may also be provided to furnish a printed sales record. It will be understood that the paper strips 145, 151, are each given an advance feed movement during each machine cycle as by means of any desired or conventional mechanism (not shown).

The reference numeral 154 designates an inking ribbon which, where the machine is fitted with the paper record strip 151, is guided along two transverse runs as is clearly shown in FIGURE 5.

Figure 4:
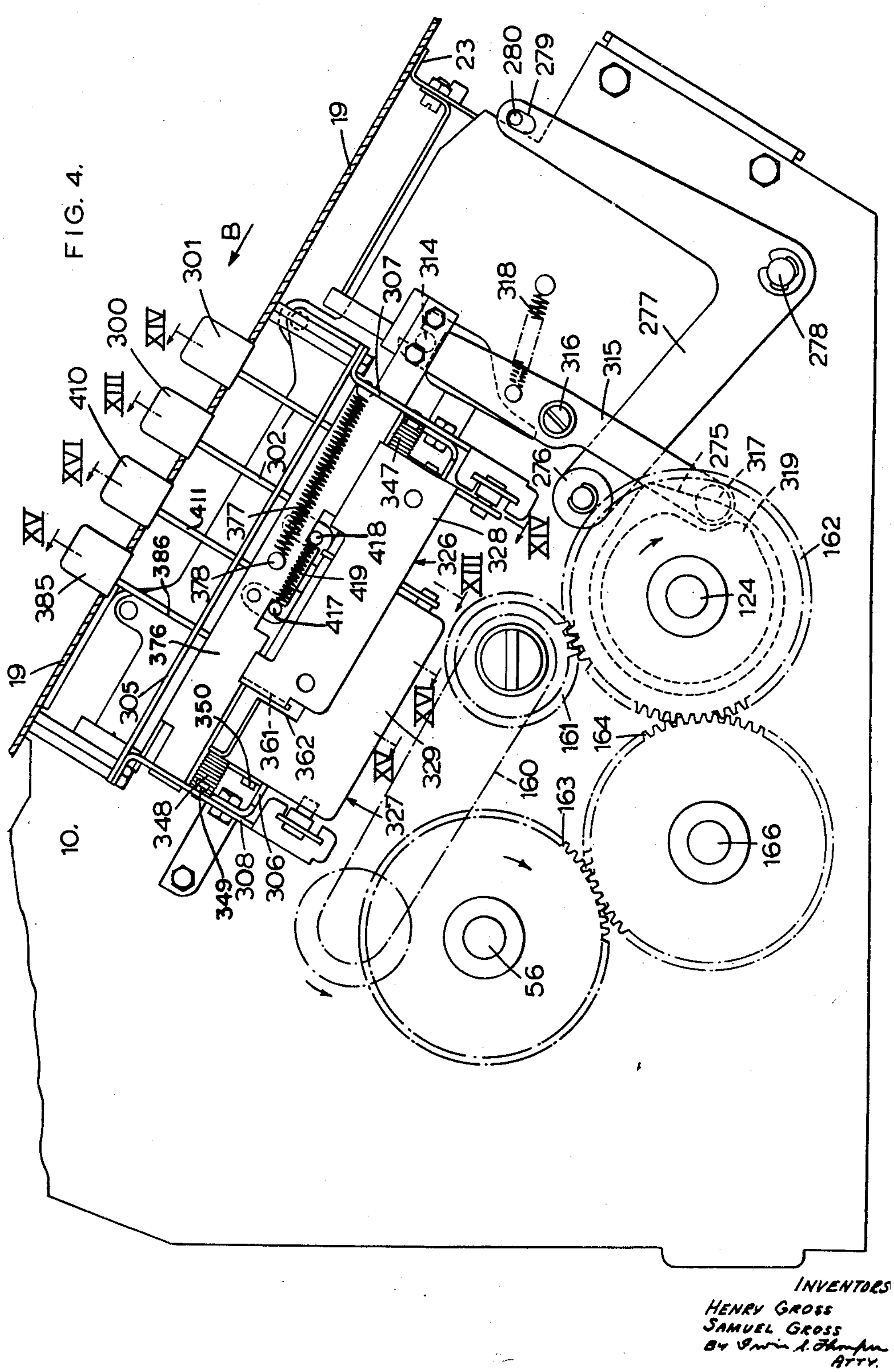
FIGURE 4 is a side elevation seen from the left-hand side of FIGURE 2.

The machine may be operated by the rotation of a crank 160 shown in chain lines in FIGURE 4 and which is attachable to a pinion 161 journalled on the side frame member 10. The pinion 161 is in mesh with a gear wheel 162 secured on camshaft 124 and said gear wheel in turn drives a second gear wheel 163 secured to the camshaft 56 through the intermediary of an idler gear 164. Preferably however, and in the detailed description which follows, an electric motor 165 is provided for this purpose, said motor being mounted on the base compartment 21 and within the cabinet 20. The idler gear 164 is secured to one end of a shaft 166 which extends through the machine and at its other end is fitted with a clutch. The latter comprises a ratchet wheel 167 freely rotatable on shaft 166 and engageable by a pawl 168 pivotally mounted on a disc 169 secured to shaft 166, said pawl being urged by a spring 170 to engage the ratchet wheel and having a tail engageable with a stop member 171 pivoted on the side frame member 11 to arrest the machine after each operative cycle. The ratchet wheel 167 is fixed to a pinion 172 driven from the motor 165 through reduction gearing 173.

The two groups of cams 122, 123 and 125, 126, 127, by which the adding units 72, 73 are rocked to engage their toothed wheels 79 with the teeth 120, 121 of rack bars 45 and thereafter to return said adding units to the rest position are such that these rocking movements are effected at different times in the operative cycle of the machine depending on the nature of the particular operation which is to be carried out. For this purpose there are provided control buttons which, in the embodiment shown, are arranged in two banks one to either side of the amount buttons 18. One of these banks comprises three buttons respectively labelled ONE ITEM, LIST and TOTAL, and the other bank comprises two buttons respectively labelled GRAND TOTAL and SUB-TOTAL. The bank of three control buttons is used individually to condition the machine to record and, when necessary total, the purchases made by an individual customer and the other bank of two control buttons is used only for totalling the purchases made in any given trading period e.g. one day.

Figure 3:
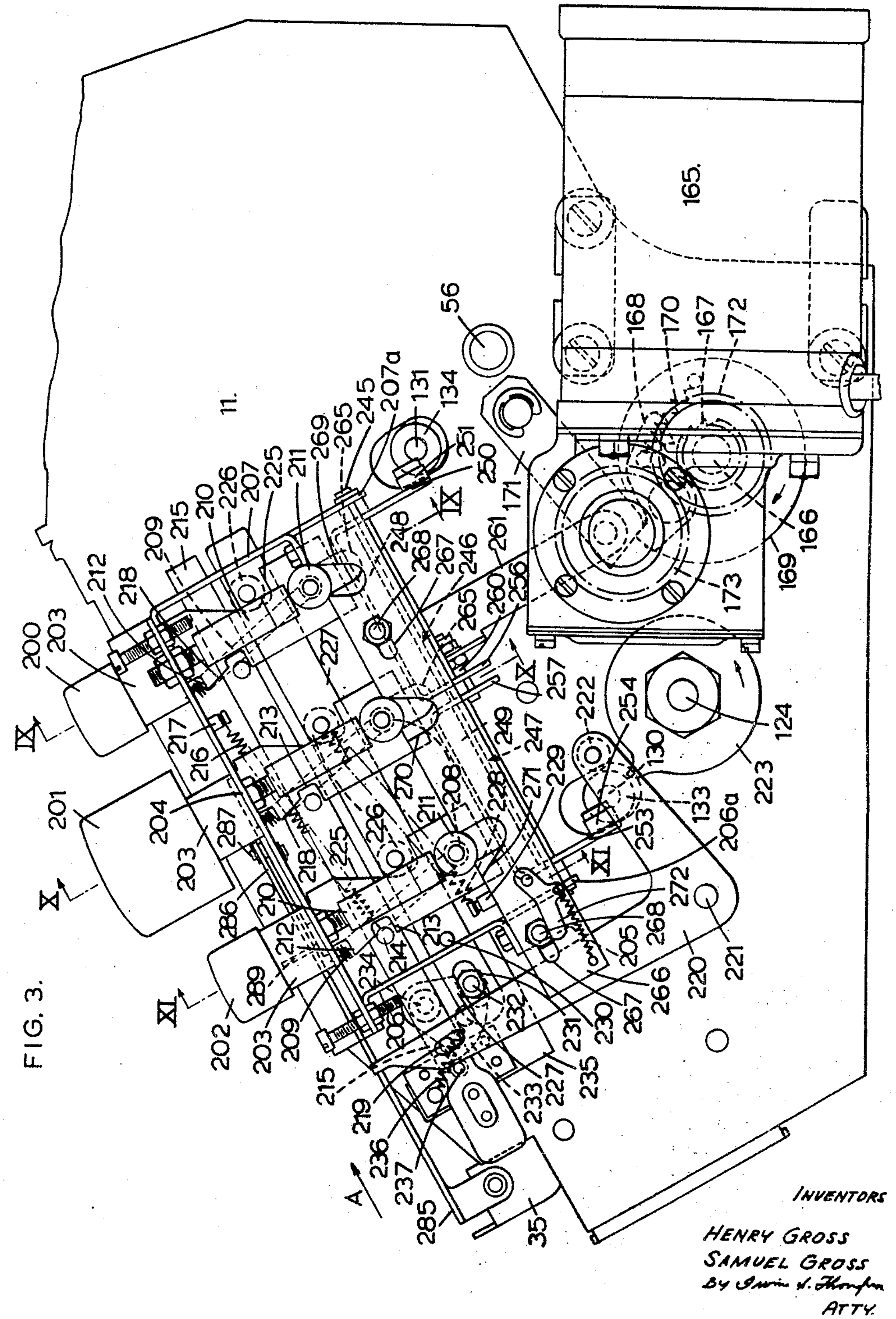
FIGURE 3 is a side elevation seen from the right-hand side of FIGURE 2.
Figures 8, 9:
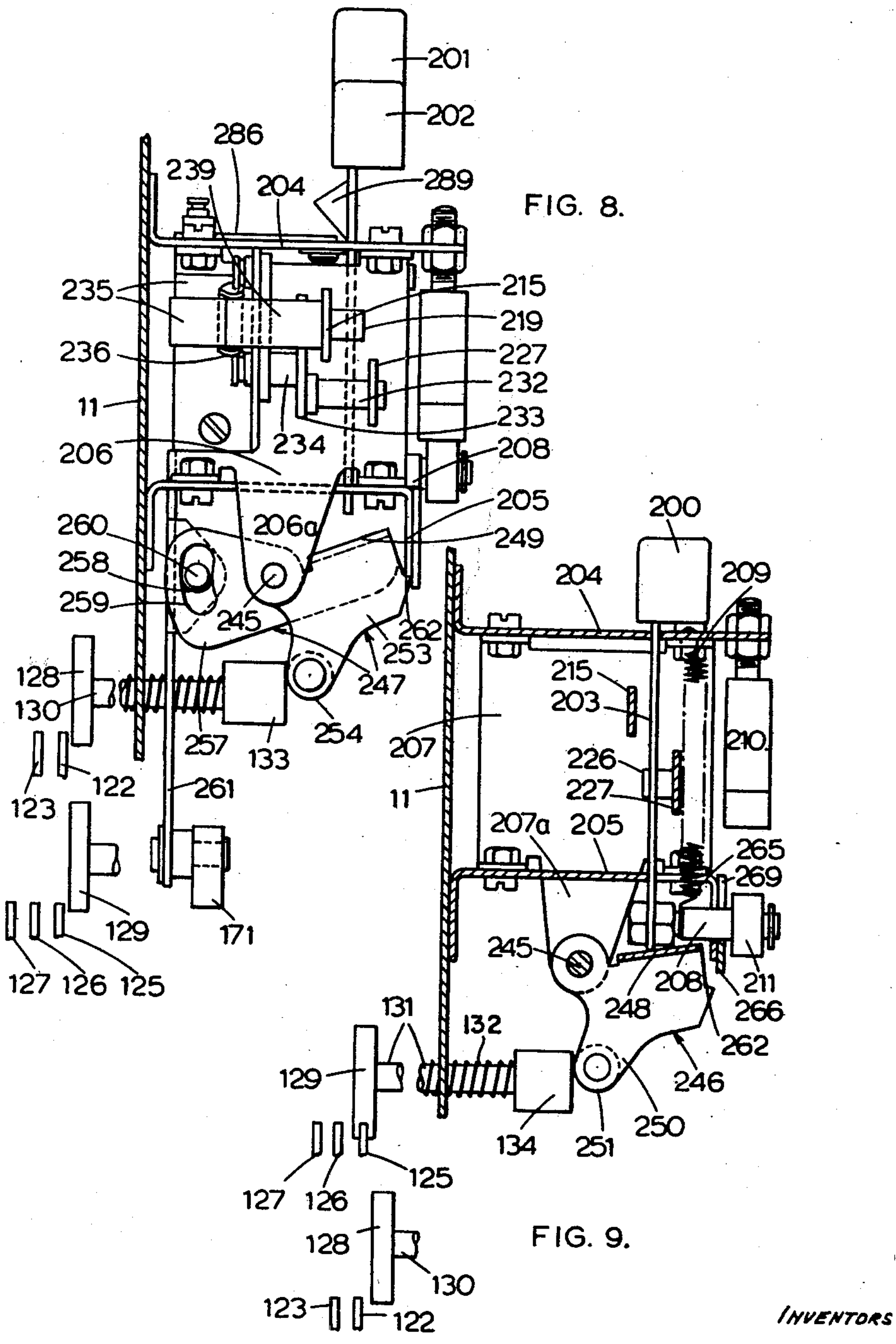
FIGURE 8 is an enlarged end elevation of one of the two control units seen in the direction of the arrow A in FIGURE 3.
FIGURE 9 is a transverse section on line IX—IX of FIGURE 3.

Each of the buttons in the three-button control bank, designated by the numerals 200, 201 and 202 respectively, is formed with a depending shank 203 which is guided in slots in an upper bracket 204 and a lower bracket 205 both secured to the side frame member 11 and projecting outwardly therefrom, said two brackets being in turn secured together by front and rear end plates 206, 207. At its lower end each shank 203 carries a laterally projecting pin 208 to which is connected one end of a tension spring 209 anchored at its other end to the upper bracket 204, said spring normally retaining the shank with its press button in the upper projected position as shown in FIGURES 3 and 8. This position of each control button is determined by the engagement, with the lower end of a depending stop member 210 secured to the upper bracket 204, of a rubber sleeve 211 on said pin 208.

In one edge each button shank 203 is formed with upper and lower notches 212, 213 cooperable with a stud 214 carried by a slide bar 215 which is guided in slots in the end plates 206, 207 and is urged in the rearward direction by a tension spring 216 anchored to one of the pins 214 and a pin 217 on the upper bracket 204. The shank edge between the two notches 212, 213 is outwardly inclined or cammed towards the upper notch as shown at 218. The slide bar 215 is coupled by a pin-and-slot connection 219 to one arm of a bell-crank lever 220 pivoted on the side frame member 11 at 221, the other arm of said lever carrying a follower roller 222 co-operable with a cam disc 223 secured on cam shaft 124.

The edges of the button shanks 203 opposite the notches 212, 213 are each formed with a notch 225 which is co-operable with a roller 226 on a slide bar 227. The bar 227 is longitudinally slidable in guide slots in the end plates 206, 207 and is urged in the forward direction by a tension spring 228 anchored at 229 to the lower bracket 205, its forward movement being limited by the engagement of a projecting pin 230 with the front frame member 26. The bar 227 is slotted at its forward end as shown at 231 and a pin 232 carried by a pawl 233 pivoted at 234 on a bracket 235 extending forwardly from the front frame member 206, is engaged in said slot, said pawl being loaded by a tension spring 236 so that its nose co-operates with a pin 237 on slide bar 215. The bracket 235 also carries the fixed contact 238 of a switch which controls the operation of motor 165, the movable contact 239 of said switch being carried by slide bar 215.

Pivotally mounted on a shaft 245 secured in downward extensions 206*a*, 207*a* of the end frame members 206, 207 are a pair of rocker members 246, 247 of generally inverted U-shape as shown in FIGURE 3. The intermediate web portion of rocker member 246 is located beneath and normally spaced from the lower ends of the shanks 203 of control buttons 200 and 201, while the intermediate web portion 249 of rocker member 247 is located beneath and normally spaced from the lower ends of the shanks 203 of control buttons 201 and 202. Rocker member 246 will thus be actuated by depression of control button 200 and rocker member 247 by depression of control button 202, while both rocker members 246, 247 will be simultaneously actuated by depression of control button 201.

One limb 250 of rocker member 246 carries a stud 251 engaged with the collar 134 on the adjacent end of the spindle 131 carrying the follower roller 129 of the accumulator counter 73, and one limb 253 of rocker member 247 similarly carries a stud 254 engageable with the collar 133 on the adjacent end of spindle 130 carrying the follower roller 128 of item counter 72. The other two limbs 256, 257 of rocker members 246, 247 are formed with slots 258, 259 within which is engaged a pin 260 on one end of a link 261 which is connected at its other end to the stop member 171 thereby to withdraw said stop member from engagement with pawl 168 and so permit engagement of the motor clutch upon depression of any one of the control buttons 200, 201, 202. Each rocker member limb 250, 253 is formed with a nose 262 which abuts the lower bracket 205 in the rest position of the rocker member under the action of spring 132.

The lower bracket 205 is formed with slots 265 through which the pins 208 on shanks 203 pass when the control buttons are depressed. An interlock plate 266 slidably supported by means of slots 267 in which engage headed pins 268 projecting from bracket 205 is also formed with slots 269, 270 and 271 for the passage of pins 208. Slot 269 has both its side faces similarly inclined to the direction of travel of the associated pin 208, while only one side face of each slot 270, 271 is so inclined. The inclined face of slot 270 is parallel to the inclined faces of slot 269 while being in the opposite direction to and at the opposite side from the inclined face of the slot 271. The plate 266 carries a round-nosed pawl 272 which is spring-loaded to engage one of the pins 268 and thereby lightly retain said plate in one or other of its end positions determined by the particular control button which has been depressed.

The functions of the control buttons 200, 201 and 202 and their associated mechanism will now be described.

With the parts in the rest position illustrated in FIGURES 3 and 8, depression of any one of the control buttons will cause slide bar 215 to be moved forwardly (to the left in FIGURE 3) by engagement of the inclined shank face 218 with the associated stud 214, while slide bar 227 will be moved in the opposite direction (to the right in FIGURE 3) by engagement of shank notch 225 with the associated roller 226. By the abutment of the forward end of slot 231 in slide bar 227 with pin 232, the nose of pawl 233 will be drawn downwardly clear of pin 237 so that when the shank notch 212 of the depressed button is registered with the stud 214 the latter will enter said notch under the action of spring 216 and slide bar 215 will move rearwardly through a distance determined by the closing of contacts 238, 239. This movement of slide bar 215 is such that the notch 212 of the depressed button will be engaged by the associated stud 214 to lock said button in its actuated position while the notches 213 of the two undepressed buttons will simultaneously be engaged by the associated studs 214 and lock said buttons against depression. As a button is being depressed one or other, or both, of the rocker members 246, 247 will be actuated to adjust one or each of the counter follower rollers 128, 129 to the desired position relative to the group or groups of cams, and the stop lever 171 will thus be disengaged from the tail of pawl 168 and so permit said pawl to engage ratchet wheel 167, which is already in rotation following the closing of motor switch contacts 238, 239.

As has been mentioned earlier, the follower rollers 128, 129 are adjusted through different axial distances in dependence upon the nature of the operation which the machine is to perform, and this requires differential movement of the rocker members 246 and 247. These differential rocker member movements are in turn dependent on the particular control button 200, 201 or 202 which is depressed. The function of the ONE ITEM button 200 is to record the purchase of a single article or the like and to cause a ticket to be issued showing the value of the purchase. The function of the LIST button 201 is to record the purchase of more than one article or the like by a customer, the value of each purchase being printed on the strip 145. The TOTAL button 202 is operated to record the total of the items recorded by the operation of the LIST button. All the purchases recorded by depression of the ONE ITEM and LIST buttons, as well as the totals of the individual customers' purchases recorded on the ticket strip 145, will also be printed on the record strip 151. The operations which are initiated by the respective control buttons will now be described.

Upon depression of the ONE ITEM button 200, its shank 203 engages the rear rocker member 246 as shown in FIGURE 9 and pivots said member in the clockwise direction about shaft 245. The shank 203 is of such length that in its fully depressed position determined by the engagement of its notch 212 with stud 214, spindle 131 is moved axially by the co-operation of stud 251 with collar 134 to locate follower roller 129 in registration with cam 125. Closing of the motor switch contacts 238, 239 and the disengagement of stop arm 171 from the tail of pawl 168 as described above produces an operative cycle of the machine during which cam shaft 56 is turned through one revolution and those rack bars 45 which have been released by their pawls 64 are moved forwardly by their springs 54 under the control of cams 55 to the extent determined by the engagement of the depressed amount buttons shanks 17 with the lugs 62 and are thereafter returned by said cam to the rest position shown in FIGURE 5. During this operation the engagement of cam 125 with follower roller 129 rocks the accumulator counter 73 upwardly about spindle 71 to engage the toothed wheels 79 thereof with the rack teeth 121 after the actuated rack bars 45 have taken up their forward positions but before they commence their return movements to the rest position, the counter being returned to its rest position after the rack bar travel has terminated. In this way each single item or purchase set up on the amount button keyboard is entered and stored in the accumulator adding unit 73, but since the rocker member 247 is unaffected by the depression of the ONE ITEM button no corresponding entries are made in the item adding unit 72. When the counter 73 and the actuated rack bars have been restored to their rest position cam disc 223 actuates bell-crank lever 220 to move slide bar 215 forwardly and thereby disengage stud 214 from the upper notch 212 in the ONE ITEM button shank. The motor switch contacts 238, 239 are thus opened to cut out the motor, the control button 200 is restored by its spring 209 to the normal projected position, slide bar 227 is returned to the forward position under the effect of spring 228, the rocker member 246 and cam follower 129 are returned to their original positions under the action of spring 132 and link 261 returns stop arm 171 to its operative position in the path of pawl 168 to arrest the machine.

When the accumulator adding unit 73 is rocked upwardly as described above, its toothed wheels will be rotated through angular distances corresponding to the rearward travel of the racks 45. If the entry of an item into said unit is such as to turn any of the toothed wheels and their trip cams 80 to the zero position shown in FIGURE 6, the corresponding trip pawls will be rocked in the counter-clockwise direction to disengage their tails 91 from bar 92. The corresponding transfer levers 82 will then be rocked by springs 95 to move each transfer pawl back through the distance of one tooth of the ratchet wheel 81 of next higher denomination and when the actuated transfer levers are afterwards returned to their normal positions by the co-operation of their rollers 100 with cams 101, each actuated transfer pawl will be advanced to turn the ratchet wheel of next higher denomination through the distance of one tooth. During the rocking movement of adding unit 73 the bail 112 will cause those transfer pawls 85 which have not been moved back to disengage from their ratchet wheels 81 but those transfer pawls which have been moved back are then out of the region of movement of the bail and thus remain in engagement with their ratchet wheels.

It will be clear from FIGURE 3 that each actuation of button 200 moves interlock plate 266 rearwardly by the engagement of its pin 208 in slot 269 and that said plate will be returned to its forward position as the button is restored to its rest position.

Figures 10, 11:
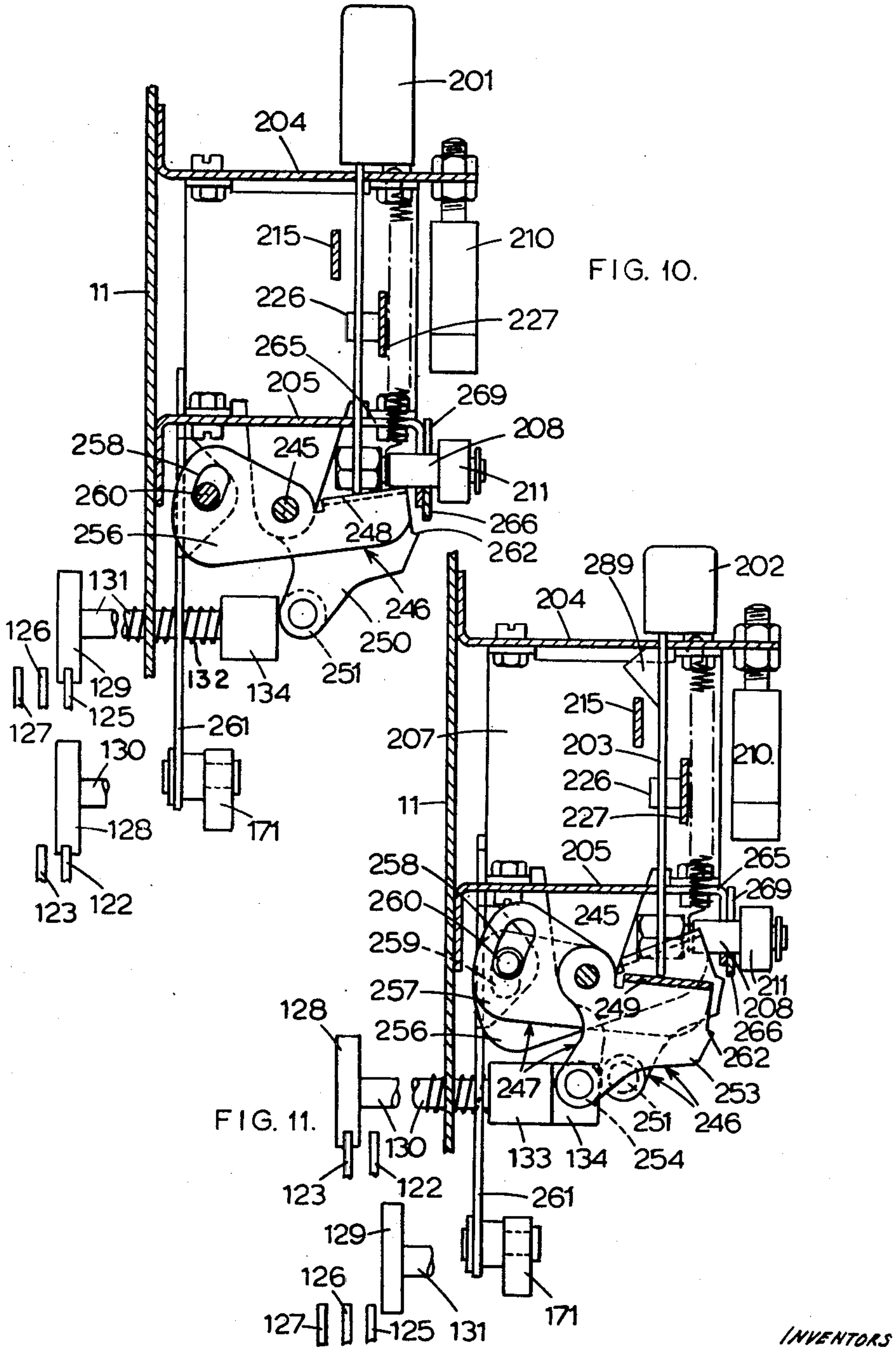
FIGURE 10 is a transverse section on line X—X of FIGURE 3.
FIGURE 11 is a transverse section on line XI—XI of FIGURE 3.

Depression of the LIST button 201 produces all the operations which are carried out upon depression of the ONE ITEM button 200, but in addition the item counter 72 also is conditioned to store the items which are successively set up on the amount button keyboard. For this purpose and as previously described, the shank 203 of button 201 is engageable on depression of the button with both rocker members 246, 247 so that said members will be pivoted through equal angular distances and follower roller 128 will be registered with cam 122 as shown in FIGURE 10. Similarly to the accumulator adding unit 73, the item adding unit 72 is rocked by cam 122 to engage its toothed wheels 79 with the teeth 120 of rack bars 45 immediately prior to the return movement of said bars to their rest position, and thus the toothed wheels, ratchet wheels and trip cams of both adding units will be actuated to store the amounts of the different items.

Actuation of the LIST button 201 moves interlock plate 266 rearwardly by the engagement of its pin 208 with the inclined rearward edge of slot 270 and said plate will then be held by the engagement of pawl 272 with pin 268 until actuation of the TOTAL button 202 restores it to its forward position by the engagement of pin 208 of button 202 with the inclined forward edge of slot 271. Since in the rearward position of plate 266 slot 265 is out of register with pin 208 of button 200, the latter button cannot be actuated, following the actuation of button 201, until the TOTAL button 202 has been actuated.

Depression of the TOTAL button 202 produces the same movements of slide bars 215 and 227 as is produced by the depression of button 200 or 201, but in this case only the rocker member 247 is pivoted out of its normal position, as is shown in FIGURE 11. The button shank 203 is here of such length that in its fully depressed position the follower roller 128 of the item adding unit 72 is moved into registration with cam 123, which operates to rock said unit first upwardly to engage its toothed wheels 79 with the teeth 120 of rack bars 45 as the latter starts to move forwardly under control of cam 55 and then downwardly to disengage said toothed wheels from said teeth before the rack bars commence their return movement. Since no transfer operation is effected during total taking the bail 112 causes all the transfer pawls 85 to be disengaged from their ratchet wheels. As the rack bars move forwardly they are arrested by their engagement with the toothed wheels 79 when the latter, which are now being rotated in the direction opposite to that in which they turn on actuation of the LIST button 201, reach the zero position, where said wheels are positively arrested by the engagement of their trip cams 80 with trip pawls 90. Thus it will be seen that the type wheels 117 will be rotated by the teeth 140 of the rack bars by the same amounts as the toothed wheels 79 during zeroising and will thus be set to print the total stored in the item counter. The total printing operation will, of course, be completed before the rack bars commence their return travel. As the accumulator adding unit 73 remains stationary upon depression of button 202 the amount stored therein is unchanged.

Since, for this total-taking operation, none of the amount buttons 18 is depressed, release of the rack bars 45 by disengaging the pawls 64 from the ratchet teeth 63 is effected by a cam 275 (FIGURE 4) on shaft 124, said cam co-operating with a follower roller 276 carried by one arm of a bell-crank lever 277 pivoted at 278 on the side frame 10. The other arm of said lever is formed with a slot 279 in which is engaged a pin 280 carried by an inverted U-shaped plate 281 pivoted on the shaft 36. The plate 281 is formed with openings 282 in its upper portion within which the tails 65 of pawls 64 are engaged. Cam 275 is shaped to allow return of the pawls 64 into engagement with the ratchet teeth 63 immediately after the toothed wheels 79 have been zeroised and before the platen 143 is operated to print the total set up on the type wheels 141, thereby locking the racks and type wheels during printing and enabling the zeroised item counter to return to its inoperative position before the racks commence their rearward travel.

To prevent actuation of TOTAL button 202 while any of buttons 18 is depressed the U-shaped bracket 35 is connected through a link 285 to a locking plate 286 pivoted at 287 on the upper bracket 204, so that when said bracket 35 is rocked forwardly by the depression of an amount button 18 plate 286 is pivoted in the counterclockwise direction as shown in FIGURE 2 to locate an extension 288 thereof in the path of a lug 289 on the TOTAL button shank 203. Bracket 204 is slotted at 290 to allow for the passage of lug 289 when the TOTAL button is depressed during normal operation.

Figure 17:
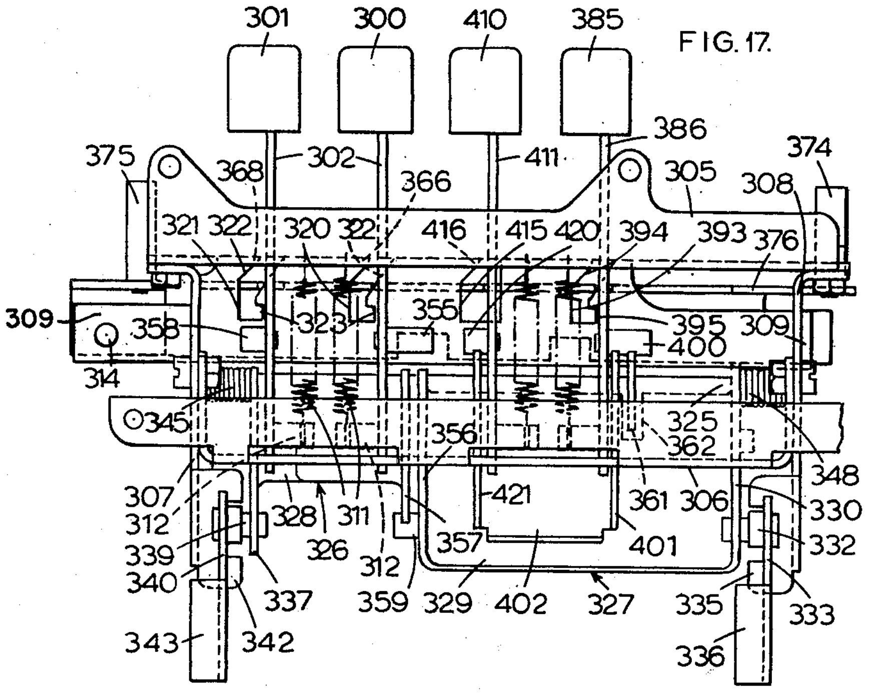
FIGURE 17 is a side elevation of the control unit of FIGURE 12 seen in the direction of arrow C in FIGURE 2.

The GRAND TOTAL and SUB-TOTAL buttons, designated by the numerals 300 and 301 respectively (see FIGURES 4, 12 to 15 and 17), are each provided with a shank 302 which is guided in slots 303, 304 in upper and lower brackets 305, 306 secured to and projecting outwardly from the side frame member 10. Brackets 305, 306 are interconnected by end frame members 307, 308 in which is guided a longitudinally slidable interlock plate or bar 309 which passes through slots 310 in the button shanks 302. The buttons 300, 301 are urged upwardly to their normal or rest position by tension springs 311 extending between pins 312 on the button shanks and anchorages on the upper bracke 305, said rest position being determined by the engagement of a shoulder 313 on the button shank with the upper bracket 305. The bar 309 carries a pin 314 at its forward end which is engaged in the bifurcated upper end of a lever 315 pivoted at 316 on the side frame member 10. Lever 315 carries at its lower end a follower roller 317 urged by a tension spring 318, connected between the lever and an anchorage on side frame member 10, into contact with a cam 319 secured to camshaft 124, and in the rest position of the machine the slide bar 309 is located in its forward position as shown in FIGURE 17. The slide bar 309 is formed with a pair of slots 320, 321 extending from the upper edge of said bar and, in the rest position of the bar, having their upper open ends in registration with the button shanks 302 as shown in FIGURE 17. The upper portion of each slot 320, 321 is inclined as indicated as 322 and the lower portion thereof is undercut as indicated at 323.

Secured in the end frame members 307, 308 is a spindle 325 on which are pivotally mounted two rocker members 326, 327, said rocker members being of generally U-shape and the spindle passing through holes in their end limbs with the intermediate or web portion 328 or 329 of each rocker member extending parallel to the spindle axis. The rear limb 330 of rocker member 327 is formed with a slot 331 (FIGURE 15) in which engages a pin 332 carried by a link 333 which extends inwardly through an opening in side frame member 10 and is slidable in guides 334 and 335 formed integrally with the rear end plate 308. The inner end of slide link 333 is bent at 336 to engage behind the follower roller 129 of the accumulator counter 73 as shown in FIGURE 2. The forward limb 337 of rocker member 326 is slotted at 338 (FIGURE 14) to engage a pin 339 carried by a link 340 which extends inwardly through an opening in the side frame member 10 and is slidable in guides 341, 342 formed integrally with the front end plate 307. The inner end of slide link 340 is bent at 343 to engage behind the follower roller 128 of the item counter 72 as also shown in FIGURE 2. The rocker member 326 is urged to abut the lower bracket 306 as is shown in FIGURE 12 by a hairpin spring 345 coiled on spindle 325 and having its ends engaged by pins 346, 347 respectively carried by the forward end frame member 307 and the adjacent limb 337 of said rocker member; and similarly the rocker member 327 is urged to abut the lower bracket 306 by another hairpin spring 348 coiled on spindle 325 and having its ends engaged by pins 349, 350 respectively carried by the rear end frame member 308 and the adjacent limb 330 of said rocker member 327; and under these conditions the follower rollers 128, 129 are held out of register with their associated cams 122, 123 and 125, 126, 127 as will be evident from FIGURE 12.

The shank of button 300 carries a pin 355 which, upon depression of said button, is engageable with the forward limb 356 of rocker member 327 and with an intermediate ate limb 357 secured to rocker member 326. The shank of button 301 also carries a pin 358 which, upon depression of said button, is engageable with the forward limb 337 of rocker member 326. The limb 356 of rocker member 327 carries a pin 359 located in a recess 360 in the lower edge of limb 357 of rocker member 326, said pin being normally located intermediate the ends of said recess. The rearward limb 361 of rocker member 326 extends through a slot 362 in the intermediate web part 329 of rocker member 327.

The functions of the GRAND TOTAL button 300 and SUB-TOTAL button 301 will now be described, it being explained firstly that these two buttons are concerned only with the operation of the accumulator counter 73 and secondly that their operations are entirely independent of and are unaffected by the cam adjusting operations effected by the depression of any of the buttons 200, 201 and 202, though it will be necessary to actuate one of said latter buttons to close the motor circuit to operate the machine.

Figure 12:
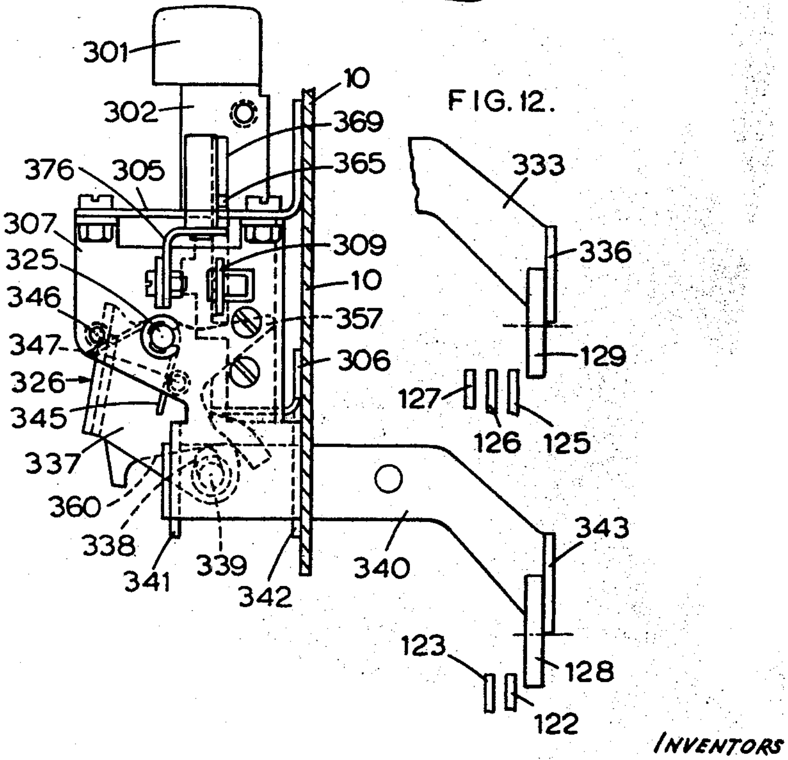
FIGURE 12 is an enlarged end elevation, partly in section, of the other control unit seen in the direction of arrow in FIGURE 4.
Figures 13, 14:
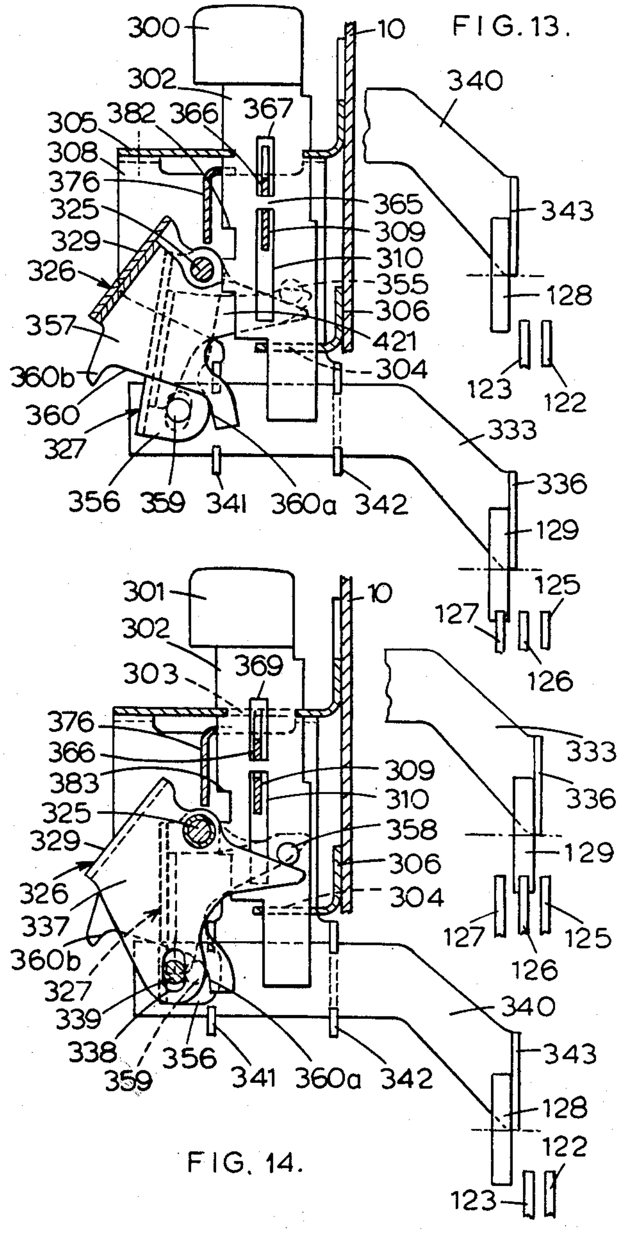
FIGURE 13 is a transverse section on line XIII—XIII of FIGURE 4.
FIGURE 14 is a transverse section on line XIV—XIV of FIGURE 4.

In the position of the parts shown in FIGURES 4, 12 and 17 and upon depression of button 300 as shown in FIGURE 13, a bridge part 365 of its shank 302 enters the open end of the associated slot 320 in slide bar 309 and moves the latter rearwardly against the action of spring 318 by engagement with the inclined part 322 of said slot, the nose portion 366 formed at the mouth of the slot 321 entering a closed slot 367 formed in the button shank above the shank part 365. When the shank part 365 is arrested by abutting the lower end of slot 322, the spring 318 moves the slide bar forwardly to locate said bridge part 365 within the undercut part 323 of slot 320 and thus lock the button in the depressed position. The rearward movement of slide bar 309 causes a nose portion 368 of said bar to enter a closed slot 369 in the shank of button 301 and since the subsequent forward movement of the slide bar to lock button 300 in the depressed position is insufficient to disengage nose 368 from shank slot 369, depression of button 301 is now prevented.

As button 300 is being depressed the pin 355 on its shank engages the intermediate limb 357 of rocker member 326 and the forward limb of rocker member 327 and pivots said rocker members in the clockwise direction as seen in FIGURE 13 about spindle 325, said members being given the same angular movement. The two links 333, 340 are thus drawn towards the left as shown in FIGURE 13 through equal distances, with the result that follower roller 129 on the accumulator counter 73 is moved into registration with cam 127 and follower roller 128 on item counter 72 is moved beyond cams 122, 123 to an idle position. When, thereafter, the machine is set in operation through the closing of motor switch contacts 238, 239 by depressing one of control buttons 200, 201 and 202, the item counter 72 will remain unactuated while the accumulator counter, by the co-operation of its follower roller 129 with cam 127, will be rocked upwardly about shaft 131 to mesh its toothed wheels 79 with the teeth 121 on rack bars 45. This takes place before the rack bars are enabled under the action of cams 55 and springs 54 to commence their forward movement and thus the travel of the rack bars is limited, as when taking a total of items entered in the item counter 72, by the rotation of toothed wheels 79 of the accumulator counter to their zero positions. The bail 112 of adding unit 73 will be actuated to retract the transfer pawls 85 from the ratchet wheels 81 as has been described above in connection with the item adding unit 72. In consequence the total stored in the accumulator counter will be set up on the type wheels during the forward travel of the rack bars and said counter, with its toothed wheels zeroised, will then be rocked downwardly to disengage said toothed wheels from the teeth before the rack bars commence their return movement.

Upon depression of the SUB-TOTAL button 301 as shown in FIGURE 14, the slide bar 309 will be actuated as described above to lock button 301 in the depressed position and prevent depression of button 300. The pin 358 on the shank of button 301 engages the forward limb 337 of rocker member 326 and pivots said member in the clockwise direction about spindle 325 and during this pivotal movement the right-hand end 360*a* of the notch 360 in the intermediate limb 357 will engage pin 359 on the forward limb 356 of the other rocker member 327. The rocker member 327 will thus also be pivoted in the clockwise direction, but through a smaller angular distance than rocker member 326 due to the lost motion between pin 359 and notch 360.

Rocker member 326 is moved through the same angular distance as on depression of the GRAND TOTAL button 300 and thus the follower roller 128 of adding unit 72 is again moved beyond cams 122, 123 to an inoperative position. The extent of lost motion between pin 359 and notch 360 is such that rocker member 327 is pivoted to register the follower roller 129 on counter 73 with cam 126, said cam operating to move rocker member 327 upwardly before the rack bars 45 are released for forward travel and to retain said rocker member in this position until the rack bars have been restored to their rear positions. Thus the total stored in counter 73 will be set up on the type wheels 141 in the same way as upon depression of the GRAND TOTAL button 300 but the toothed wheels 79, instead of remaining in the zero positions, will be rotated by the rearward travel of the rack bars to the angular positions which they previously occupied. The bail 112 of adding unit 73 will again be actuated as on depression of the GRAND TOTAL button 300, to disengage the transfer pawls 85 of said unit from their ratchet wheels 81, but in this case the bail will remain operative to hold the transfer pawls retracted until after the toothed wheels 79 have been returned to their previous angular positions. Thus, while the total stored in the accumulator counter is printed on the paper strips 145, 151 by depressing button 301, it is nevertheless retained in said counter until the latter has been zeroised by depressing GRAND TOTAL button 300.

It will be clear by comparison of FIGURES 9, 10 and 11 with FIGURES 13 and 14 that the axial movements imparted to the counter follower rollers 128, 129 upon depression of any one of buttons 200, 201 and 202 are different from those produced by depression of button 300 or 301; and that since the buttons 300 and 301 effect greater axial movement of said follower rollers than the buttons 200, 201 and 202, depression of any of the latter buttons to close the motor circuit will have no effect on the adjustments of the follower rollers produced by either the GRAND TOTAL or SUB-TOTAL button.

Figure 18:
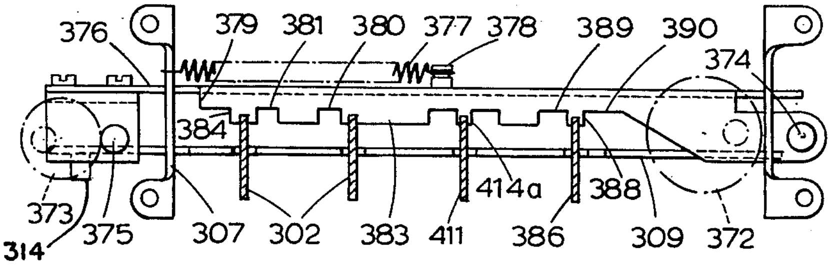
FIGURE 18 is a plan view of the control unit of FIGURE 12 wtih the upper bracket omitted.

It is customary, in machines of the class described above, to provide for actuation of the GRAND TOTAL and SUB-TOTAL buttons only by authorized persons and these buttons are normally secured against depression by means of key-operable locks. For example, and as provided in the machine of this invention, a lock is employed for the GRAND TOTAL button which can be released only by the proprietor, and a further lock is employed for the SUB-TOTAL button which can be released only by the manager or by the proprietor. Such locks are illustrated at 370 and 371 in FIGURE 1 and each includes a cam or eccentric 372 or 373 (FIGURE 18) which is secured to the lock barrel for rotation therewith during turning of the key. The cams are co-operable with pins 374, 375 projecting upwardly from a slide bar 376 which is guided for longitudinal movement in slots in the end frame members 307, 308 and which is urged towards the front of the machine by a tension spring 377 connected at one end to a pin 378 on said bar and its other end to the front frame member 307, said forward movement being limited by engagement of a shoulder 379 with the forward end frame member 307. Bar 376 is formed with two notches 380, 381 which are spaced apart by a distance less than that between the shanks 302 of buttons 300 and 301, and when the two locks are operative, as shown in FIGURE 18, the bar is located in an intermediate position in which both notches are out of register with the button shanks 302. When lock 370 is released by turning its key through 180° cam 372 engages pin 374 to move the slide bar against the action of spring 377 through a distance such that a shoulder 382 on the shank of button 300, which shoulder normally rests on a lateral extension 383 of said bar, is registered with notch 380. Thus in this position of the bar 376 the GRAND TOTAL button can be actuated. When, on the other hand, lock 371 is released, cam 373 is turned to permit the forward movement of bar 376, under the effect of spring 377, through a distance such that a shoulder 383 on the shank of the SUB-TOTAL button 301, and which normally rests on a lateral extension 384 of the bar, is registered with notch 381. Consequently in this position of bar 376 the SUB-TOTAL button can be actuated.

The use of the machine described can be extended to record money paid out from the cash drawer. As shown the left-hand bank comprising the GRAND-TOTAL and SUB-TOTAL buttons includes a PAID OUT button 385 (FIGURE 15) the shank 386 of which is formed with a shoulder 387. When the locks 370, 371 are conditioned to locate slide bar 376 in the intermediate position shown in FIGURE 18, shoulder 387 is engaged with a lateral extension 388 of the slide bar and the button is thus inoperable. The slide bar is formed with a pair of notches 389, 390 so located that, when said bar is moved to its rear position by turning lock cam 372, said shoulder 387 is registered with the notch 390, while when said bar is moved to its forward position, shoulder 387 is registered with notch 389. Thus button 385 can be actuated only on release of one or other of the locks 370, 371.

The shank 386 of the PAID OUT button 385 is slotted at 391, 392 similarly to the shanks 302 of the GRAND TOTAL and SUB-TOTAL buttons to provide for the travel of slide bar 309, and said bar is formed with an open ended slot 393 having an inclined upper end portion 394 and an undercut lower portion 395 similarly to button shanks 302. Thus the button 385 is operable in only one or other end position of slide bar 376.

When the PAID OUT button is depressed, a pin 400 on the shank 386 engages the rear end limb 401 of a U-shaped plate 402 secured to the rocker member 327 and also engages the rear end limb 361 of the rocker member 326, said latter limb, as previously described, projecting through a slot 362 in the rocker member 327. The two rocker members are pivoted through equal angular distances to move the follower rollers 128, 129 beyond and clear of the cams 122, 123 and 125, 126, 127 respectively so that neither counter 72, 73 is swung upwardly to engage its toothed wheels 79 with the rack bars. It will be clear that, as in the case of buttons 300 and 301, depression of any button 200, 201 or 202 to start the machine after actuation of button 385 will have no effect on the counters 72, 73 because the follower rollers 128, 129 have already been adjusted beyond the positions to which they can be moved by depression of button 200, 201 or 202. Amounts paid out of the cash drawer are recorded on the ticket and record strips 145, 151 by depression of the appropriate amount buttons.

Another button which can be included in the bank comprising the GRAND TOTAL and SUB-TOTAL buttons is one which conditions the machine to carry out an addition other than a cash transaction, i.e. without adding the items in such addition into the accumulator counter 73. Such a button, which may be labeled + and is shown at 410, has its shank 411 slotted at 412, 413 similarly to the shanks 302 of buttons 300 and 301 for the passage of slide bar 309, and said shank is also formed with a shoulder 414 which normally rests on a lateral extension 414*a* of slide bar 376. Slide bar 309 is formed with an open-ended slot 415 which provides a nose 416 engageable in the upper shank slot 413, but instead of undercutting said slot 415 to retain the button 410 in the depressed position, a pair of detent pawls 417, 418 are mounted on slide bar 376. The two pawls are interconnected by a tension spring 419 and the arrangement is such that pawl 417 is engageable with the shoulder 414 when the slide bar 376 is in one end position while the pawl 418 is engageable with said shoulder when said plate is in the other end position.

Figures 15, 16:
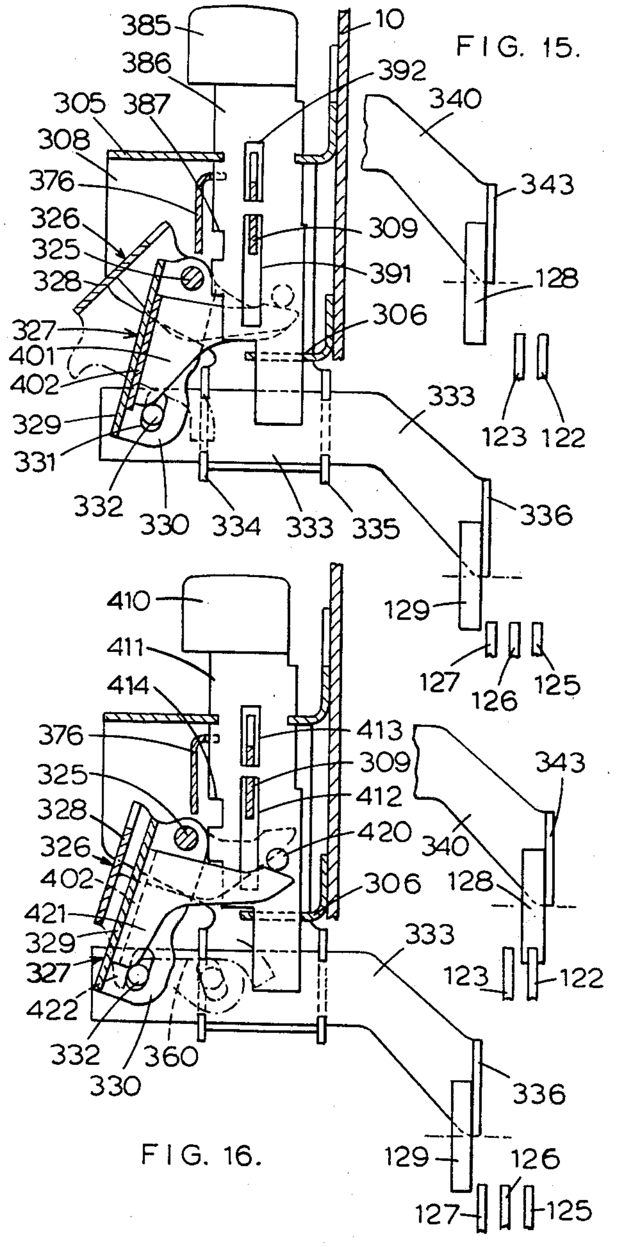
FIGURE 15 is a transverse section on line XV—XV of FIGURE 4.
FIGURE 16 is a transverse section on line XVI—XVI of FIGURE 4.

On depression of button 410 a pin 420 on shank 411 engages the forward limb 421 of U-shaped plate 402 and thus pivots rocker member 327 in the clockwise direction as seen in FIGURE 16. The pin 359 on the forward limb 356 of rocker member 327 traverses notch 360 until it engages the left-hand end 360*b* thereof, whereby rocker member 326 is also pivoted in the clockwise direction. The movements of the two rocker members are transmitted by links 340 and 333 to the follower rollers 128, 129 to move roller 128 into registration with cam 122 and roller 129 beyond and clear of cams 125, 126 and 127. Consequently accumulator counter 73 will remain in its lower inoperative position while item counter 72 will be pivoted upwardly on operation of the machine to engage its toothed wheels 79 with rack bar teeth 120. The operation of counter 72 is then as previously described in connection with the entry of items into said counter by depression of either of buttons 200, 201 the total button 202 being inoperable to set the machine in operation during entry of the items into counter 72 due to the location of stop arm extension 287 in the path of lug 288, but subsequently being operable to total said items.

While actuation of the GRAND TOTAL button 300 results in zeroising of the accumulator adding unit 73, actuation of the SUB-TOTAL button 301 also produces a sales total but without zeroising said adding unit. Nevertheless it may be preferred to provide only the GRAND TOTAL button and to omit the SUB-TOTAL button or vice versa. The ONE ITEM button 200 may also be dispensed with, in which case the LIST and TOTAL buttons 201, 202 can be actuated successively first to enter and print the amount of a single sale and then to print the same amount as a total and zeroise the item counter 72. Thus in its simplest form the right-hand control bank comprises only the buttons 201 and 202 while the left-hand control bank comprises only the button 300 or 301.

As will be evident from the foregoing, depression of the button 200, 201 or 202 will condition the machine for one of three particular operations and will also cause the machine to carry out a full operational cycle, while depression of button 300 or 301 will condition the machine to carry out one or other of two operations different from those controlled by the buttons 200, 201 and 202. Depression of button 300 or 301 will not, however cause the machine to operate, such operation requiring the depression of button 200, 201 or 202 the only effect of which will be to close the motor switch contacts.

Different symbols may be used to indicate the different totals printed on strips 145, 151. For example, a simple item printed on depression of button 200 or a total of items printed on depression of button 202 may be indicated by an arrow. A sub-total may be indicated by letter S and a grand total by letter G. Amounts paid out may be designated by the symbol P/O and additions carried out by depression of button 410 may be indicated by the + sign.

While the machine described above has an item adding unit and an accumulator adding unit, additional adding units may be fitted for the purpose of, for example, dissecting sales of different lines or classes of goods under control of operator-actuated buttons The two groups of control press buttons with their interlock mechanism and rocker plates are, as above described, each mounted in a sub-frame as a self-contained unit which is removably secured to one of the side frame members 10, 11. This arrangement has the advantage of very considerably simplifying the assembly of the machine as well as, upon detaching said units, providing ready access to their mechanisms.

We claim:

1. In a cash register of the class described, having a pair of counter units pivotable about parallel axes and each having toothed wheels aligned with movable rack elements, cam followers on said counter units each cooperable with one of two groups of coaxial cams, each cam follower including a roller rotatable about an axis parallel to the pivotal axes of said counter units and movable in the direction of its axis of rotation, means to rotate said groups of cams, and means to move the follower roller on one or each of said counter units in the direction of its pivotal axis to register with a selected cam of the associated group of cams whereby said counter unit is rocked during a predetermined phase in the movement of the rack elements first into and then out of an operative position in which the toothed wheels thereof are meshed with the rack elements.

2. In a cash register of the class described, having a pair of counter units pivotable about parallel axes and each having toothed wheels aligned with movable rack elements, cam followers on said counter units each cooperable with one of two groups of coaxial cams, each cam follower including a roller rotatable about an axis parallel to the pivotal axes of said counter units and movable in the direction of its axis of rotation, means to rotate said groups of cams, means to retain each of said follower rollers resiliently in an end position out of register with the associated group of cams, and means to move the follower roller on one or each of said counter units from said end position in the direction of its pivotal axis to register with a selected cam of the associated group of cams whereby said counter unit is rocked during a predetermined phase in the movement of the rack elements first into and then out of an operative position in which the toothed wheels thereof are meshed with the rack elements.

3. A cash register according to claim 2, wherein each counter unit includes a spindle on which the cam follower roller is rotatably mounted, a frame in which said spindle is axially slidable, and a compression spring coiled about said spindle and interposed between said frame and a collar on the spindle.

4. In a cash register of the class described, having a pair of counter units pivotable about parallel axes and each having toothed wheels aligned with movable rack elements, cam followers on said counter units each cooperable with one of two groups of coaxial cams, each cam follower including a roller rotatable about an axis parallel to the pivotal axes of said counter units and movable in the direction of its axis of rotation, means to rotate said groups of cams, and means to move the follower roller on one or each of said counter units in the direction of its pivotal axis to register with a selected cam of the associated group of cams whereby said counter unit is rocked during a predetermined phase in the movement of the rack elements first into and then out of an operative position in which the toothed wheels thereof are meshed with the rack elements, said last-named means comprising manually actuable pivotally mounted rocker members engageable with the cam followers.

5. In a cash register of the class described, having a pair of counter units pivotal about parallel axes and each having toothed wheels aligned with movable rack elements, spindles mounted in said counter units for axial sliding movement parallel to the pivotal axes of said units, cam follower rollers mounted to rotate on and to move axially with said spindles, each follower roller being cooperable with one of two groups of coaxial cams having their axes parallel to the pivotal axes of the counter units, means to rotate said groups of cams, pairs of pivotally mounted rocker members, the rocker members of one of said pairs being engageable with said follower rollers and the rocker members of the other one of said pairs being engageable with said spindles, and first and second banks of push buttons which on depression effect rocking movement of said rocker members to move the follower roller on one or each of said counter units in the direction of its pivotal axis to register with a selected cam of the associated group of cams whereby either one or other or each of said counter units is rocked during a predetermined phase in the movement of the rack elements first into and then out of an operative position in which the toothed wheels thereof are meshed with the rack elements.

6. A cash register according to claim 5, said push buttons being formed with depending shanks resiliently engaged by the rocker members.

7. In a cash register of the class described, having a pair of counter units pivotal about parallel axes and each having toothed wheels aligned with movable rack elements cam followers on said counter units each cooperable with one of two groups of coaxial cams, each cam follower including a roller rotatable about an axis parallel to the axes of said counter units, an electric motor, clutch means to drive said groups of cams from said motor and to interrupt said drive on completion of each cycle of operation of the machine, first and second banks of push buttons, a switch in the motor circuit actuable by depression of any one of the push buttons in said first bank to close the motor circuit, and means operable upon depression of one of the push buttons in said first and second banks to move the follower roller on one or each of said counter units in the direction of its pivotal axis to register with a selected cam of the associated group of cams whereby said counter unit is rocked during a predetermined phase in the movement of the rack elements first into and then out of an operative position in which the toothed wheels thereof are meshed with the rack elements.

8. A cash register according to claim 7, wherein the switch in the motor circuit includes a movable contact carried by a slide bar which, on actuation of any one of the push buttons of said first bank, is resiliently moved to close the switch.

9. In a cash register of the class described, having a pair of counter units pivotable about parallel axes and each having toothed wheels aligned with movable rack elements, cam followers on said counter units each cooperable with one of two groups of coaxial cams, each cam follower including a roller rotatable about an axis parallel to the pivotal axes of said counter units and movable in the direction of its axis of rotation, means to rotate said groups of cams, means to move the follower roller on one or each of said counter units in the direction of its pivotal axis to register with a selected cam of the associated group of cams whereby said counter unit is rocked during a predetermined phase in the movement of the rack elements first into and then out of an operative position in which the toothed wheels thereof are meshed with the rack elements, a frame in which the toothed wheels of each counter unit are journalled, a ratchet wheel and trip cam secured to each toothed wheel, transfer levers pivotally mounted in said frame, transfer pawls on said transfer levers engaged with said ratchet wheels, trip pawls engageable with the trip cams to position the transfer levers for transfer under control of transfer cams, a bail pivoted on said frame and engageable with the transfer pawls, said bail being engaged with a stationary part of the machine as the counter unit is being rocked to mesh the toothed wheels thereof with the rack elements thereby to retract the transfer pawls from the ratchet wheels and so permit the toothed wheels to be zeroised by rotation in the reverse direction during the return movement of the rack elements.

References Cited by the Examiner

UNITED STATES PATENTS

| | | | |
|---|---|---|---|
| 1,142,079 | 6/15 | Cleal | 235—3 |
| 1,203,863 | 11/16 | Ellis | 235—60 |
| 2,110,987 | 3/38 | Kammel | 235—60 |
| 2,124,176 | 7/38 | Lasker | 235—60 |
| 2,226,451 | 12/40 | Sturm | 235—60 |
| 2,657,854 | 11/53 | Demeulenaere | 235—60 |
| 2,724,550 | 11/55 | Drake | 235—3 |
| 2,880,930 | 4/59 | Werner | 235—60 |
| 2,911,141 | 11/59 | Jackson | 235—60 |
| 2,962,209 | 11/60 | Werner | 235—6 |

FOREIGN PATENTS

| | | |
|---|---|---|
| 542,411 | 4/56 | Italy. |

LEO SMILOW, *Primary Examiner.*